Patented Jan. 19, 1943

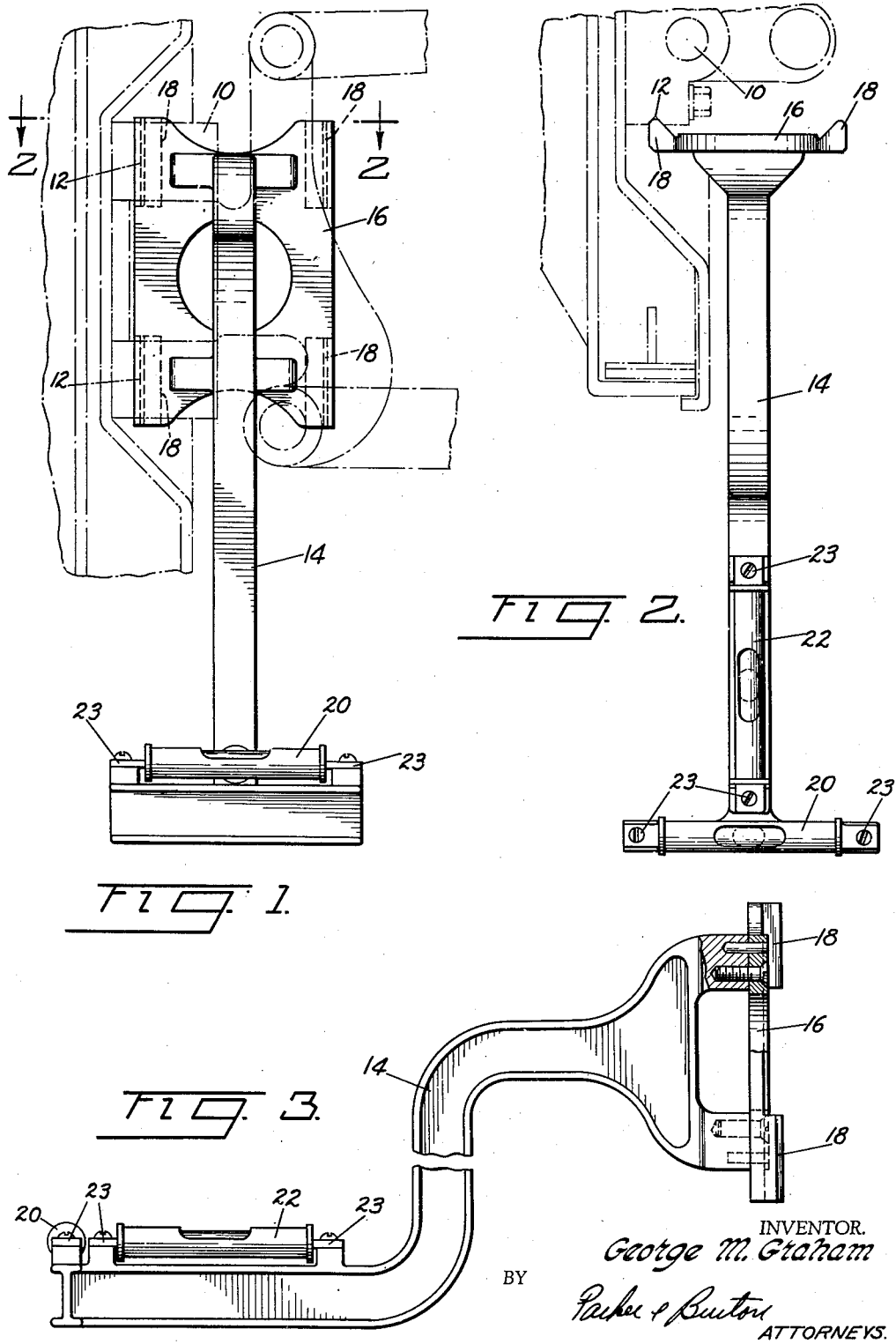

2,308,808

UNITED STATES PATENT OFFICE 2,308,808

WHEEL ALIGNMENT GAUGE

George M. Graham, Detroit, Mich., assignor to Hinckley-Myers Company, Jackson, Mich., a corporation of Michigan Application October 9, 1940, Serial No. 360,473

2 Claims. (Cl. 33—203)

This invention relates to an improved front wheel alignment gauge for motor vehicles.

More particularly the invention relates to an improved gauge structure whereby the front wheels of a motor vehicle may be checked for camber and caster alignment.

It is particularly adapted for the checking of a front wheel wherein the brake backing plate of the wheel is recessed to receive within the recess, in part at least, the steering knuckle assembly. The gauge device is so formed that it can be brought into engagement with the proper part of the steering knuckle assembly within said recess to check the desired alignment of the wheel.

An object is to provide a gauge of the character described which is simple and inexpensive, of strong and rugged construction and is readily usable by anyone to check the alignment factors it is designed to cover.

This improved gauge does not embody any moving parts requiring adjustment or placement to accomplish the desired readings. It is adaptable for use with either front wheel of the motor vehicle. It is adapted to indicate by a single placement the alignment as to both caster and camber.

Other objects, advantages and meritorious features of the invention will more fully appear from the following specification, appended claims, and accompanying drawing, wherein:

Figure 1 is an elevation of a gauge embodying my invention placed in position for use, Fig. 2 is a sectional view taken on the line 2—2 of Fig. 1, and Fig. 3 is an elevation partly in section of the gauge itself taken at right angles to the view of the gauge in Fig. 1.

Two of the characteristics which it is desirable to accurately maintain in the alignment of the front or steering wheels for motor vehicle wheels are caster and camber. In order that the vehicle may steer properly and travel properly over the road it is necessary that the caster and camber be maintained as intended in the engineering of the vehicle.

This invention is an improved gauge structure which is intended to be used to check the caster and the camber of the front wheels of a vehicle.

The gauge is provided with contact means adapted to be placed against a part of the steering knuckle or wheel assembly and with registering and indicating means adapted to register and indicate variations of caster and camber. The gauge is so constructed that its contact means is adapted to be engaged with a part of the steering knuckle assembly which is ordinarily difficult of access.

Certain vehicle wheels such as those on the present day Buick are provided with backing plates which are recessed to receive within the recess a part of the steering knuckle assembly. This particular gauge is so constructed that its contact points which are brought into engagement with part of the wheel assembly may be brought into such engagement within such a recess. On this particular motor vehicle the steering knuckle assembly 10 is provided with a seating groove or grooves which is located within this recess and which is adapted to be engaged by contact points of suitable gauge mechanism for checking alignment factors.

This particular gauge comprises a handle or supporting element 14 which is shaped as shown in Fig. 3. There is secured to one end of the gauge contact means adapted to be brought into contact with designated parts of the wheel assembly such as the grooves 12. The particular construction here shown comprises a plate 16 which is secured to the end of the element 14. This plate projects laterally on opposite sides of the supporting element and carries two pairs of contact points. Each pair of contact points comprise an upper and lower contact point indicated by the numeral 18. The upper and lower contact points of each pair are in alignment.

It will be noted that each pair of contact points is offset laterally the vertical plane of the support element 14. Due to this lateral offsetting of contact points it is apparent that one pair of contact points may readily be seated within the grooves 12 of the steering knuckle assembly on the left front wheel within the recess of its backing plate and the other pair of contact points may be readily seated within similar grooves 12 of the steering knuckle assembly of the right front wheel within the recess of its backing plate.

At the opposite end the gauge supporting element 14 carries two spirit levels. One spirit level is indicated as 20 and the other spirit level is indicated as 22. These two spirit levels are disposed at right angles to each other. These two spirit levels are shown as arranged in substantially the same horizontal plane and this horizontal plane is normal to the vertical line established by either pair of contact points. In other words, the projection of the line established by either pair of contact points 18 is perpendicular to the projection of the line of flotation of the bubble within either spirit level.

The spirit level 22 is adapted to register caster. The spirit level 20 is adapted to register camber. The spirit level glasses are graduated in degrees and the degree of caster and camber desired for any particular job is established by the manufacturer. It therefore is possible to readily determine whether the caster and camber of any particular wheel assembly is correct. These readings will be taken simultaneously from the single placement of the contact points against the steering knuckle assembly.

If camber alone were to be taken it might even be taken from the wheel hub by bringing the contact points thereagainst. Such camber reading, however, would be indicated by the caster spirit level 22.

If it were desired to have the zero point on the spirit level indicate the correct caster reading one end of the spirit level might be shimmed up. It will be noted that the ends 23 of the spirit levels are secured by screws or the like to suitable supports and shims might be inserted under one end of either spirit level so that at zero the bubble would actually be indicating a predetermined caster or camber variation rather than zero variation, and variation from zero would indicate variation from this predetermined caster or camber rather than variation from zero caster or camber.

What I claim:

1. A gauge for checking the caster and camber of the two swivelled road wheels at opposite ends of a vehicle axle comprising a supporting bar having substantially parallel opposite end portions offset as to longitudinal alignment with respect to each other by an intervening intermediate portion with respect to which each end portion extends perpendicularly, a face plate secured normal to the outer end of one end portion, two substantially parallel pairs of contact points projecting outwardly substantially normal to the face of said plate, one pair of contact points disposed offset laterally beyond one side of the bar and the other pair of contact points disposed offset laterally beyond the opposite side of the bar, one pair of contact points adapted to be brought into contact with suitable parts of the swivelled wheel assembly at one end of the axle and the other pair of contact points adapted to be brought into contact with the corresponding parts of the swivelled wheel assembly at the opposite end of the axle, two spirit levels mounted upon the opposite end portion of the bar, one spirit level having its longitudinal axis extending parallel to such end portion of the bar, the other spirit level disposed substantially perpendicularly with respect to the first spirit level.

2. A gauge for checking caster and camber of the two swivelled road wheels at opposite ends of the vehicle axle consisting of a bar having opposite end portions extending in substantially parallel alignment but offset from each other by a connecting intermediate portion of the bar which extends at substantially a right angle to said end portions, a face plate secured substantially normal to the outer end of the one end portion, two substantially parallel pairs of contact points projecting outwardly beyond the face of said plate and offset vertically and transversely beyond opposite sides of the adjacent end portion of the bar, the opposite end portion of the bar provided with a T head disposed perpendicularly thereto, a spirit level supported upon and extending linearly of said T head, and a second spirit level supported upon and extending linearly of the end portion to which the T head is secured.

GEORGE M. GRAHAM.